United States Patent
Takikawa et al.

(10) Patent No.: US 8,423,785 B2
(45) Date of Patent: Apr. 16, 2013

(54) AUTHENTICATION APPARATUS AND PORTABLE TERMINAL

(75) Inventors: Erina Takikawa, Nara (JP); Takayoshi Yamashita, Kyoto (JP); Satoshi Hosoi, Kusatsu (JP)

(73) Assignee: Omron Corporation, Kyoto (JP)

( * ) Notice: Subject to any disclaimer, the term of this patent is extended or adjusted under 35 U.S.C. 154(b) by 1106 days.

(21) Appl. No.: 11/598,105

(22) Filed: Nov. 13, 2006

(65) Prior Publication Data

US 2007/0113099 A1 May 17, 2007

(30) Foreign Application Priority Data

Nov. 14, 2005 (JP) .................................. 2005-329227
Aug. 31, 2006 (JP) .................................. 2006-235283

(51) Int. Cl.
*G06F 21/00* (2006.01)

(52) U.S. Cl.
USPC ................. 713/186; 713/182; 726/4; 726/17; 382/324; 382/117

(58) Field of Classification Search .......... 713/180–185, 713/186; 726/11, 4, 17; 455/411
See application file for complete search history.

(56) References Cited

U.S. PATENT DOCUMENTS

| | | | | |
|---|---|---|---|---|
| 6,232,874 B1 * | 5/2001 | Murphy | ................... | 340/426.19 |
| 6,970,789 B2 * | 11/2005 | Ippolito et al. | ................... | 702/21 |
| 7,073,067 B2 * | 7/2006 | Mizrah | ........................ | 713/183 |
| 7,146,027 B2 * | 12/2006 | Kim et al. | ...................... | 382/117 |
| 7,155,035 B2 * | 12/2006 | Kondo et al. | .................. | 382/117 |
| 7,424,135 B2 * | 9/2008 | Gifford et al. | ................. | 382/115 |
| 7,502,933 B2 * | 3/2009 | Jakobsson et al. | ............ | 713/172 |
| 7,561,191 B2 * | 7/2009 | May et al. | ................... | 348/240.2 |
| 7,847,675 B1 * | 12/2010 | Thyen et al. | ................... | 340/5.2 |
| 8,056,802 B2 * | 11/2011 | Gressel et al. | ................ | 235/382 |
| 2002/0083329 A1 * | 6/2002 | Kiyomoto | ..................... | 713/186 |
| 2002/0152390 A1 * | 10/2002 | Furuyama et al. | ............ | 713/185 |
| 2003/0049027 A1 | 3/2003 | Umeda et al. | | |
| 2004/0037450 A1 * | 2/2004 | Bradski | ......................... | 382/103 |
| 2004/0098598 A1 * | 5/2004 | Wolfram | ....................... | 713/186 |
| 2004/0119851 A1 * | 6/2004 | Kaku | ............................. | 348/239 |
| 2004/0123131 A1 * | 6/2004 | Zacks et al. | ................... | 713/200 |
| 2004/0151347 A1 * | 8/2004 | Wisniewski | .................. | 382/115 |
| 2004/0151348 A1 | 8/2004 | Ono | | |
| 2004/0198477 A1 * | 10/2004 | Jung et al. | .................. | 455/575.4 |

(Continued)

FOREIGN PATENT DOCUMENTS

CN 1269523 A 10/2000
EP 1 594 085 A1 11/2005

(Continued)

OTHER PUBLICATIONS

Marc Davis, Towards Context—Aware Face recognition, Mar. 2005, ACM international, vol. 5, pp. 2-4.*

*Primary Examiner* — Nathan Flynn
*Assistant Examiner* — Viral Lakhia
(74) *Attorney, Agent, or Firm* — Dickstein Shapiro LLP

(57) ABSTRACT

An authentication apparatus includes an imaging device having at least one of a macro imaging function, an auto focusing function and a zoom imaging function, an authentication device for authenticating a user through a face image picked up by the imaging device, and an authentication limiting device for canceling the specified function of the imaging device in picking up an image for the user authentication.

12 Claims, 11 Drawing Sheets

U.S. PATENT DOCUMENTS

| | | | |
|---|---|---|---|
| 2005/0008200 A1* | 1/2005 | Azuma et al. | 382/117 |
| 2005/0104992 A1 | 5/2005 | Aoyama et al. | |
| 2005/0138392 A1* | 6/2005 | Johnson et al. | 713/186 |
| 2005/0221798 A1* | 10/2005 | Sengupta et al. | 455/411 |
| 2005/0249381 A1* | 11/2005 | Silvester et al. | 382/115 |
| 2006/0080547 A1* | 4/2006 | Higashiura et al. | 713/186 |
| 2006/0093183 A1* | 5/2006 | Hosoi | 382/103 |
| 2006/0098097 A1* | 5/2006 | Wach et al. | 348/207.99 |
| 2006/0120570 A1* | 6/2006 | Azuma et al. | 382/117 |
| 2006/0147093 A1* | 7/2006 | Sanse et al. | 382/115 |
| 2006/0186205 A1* | 8/2006 | Page | 235/462.22 |
| 2006/0212718 A1* | 9/2006 | Senga | 713/186 |
| 2006/0230286 A1* | 10/2006 | Kitada | 713/186 |
| 2006/0282671 A1* | 12/2006 | Burton | 713/176 |
| 2006/0288234 A1* | 12/2006 | Azar et al. | 713/186 |
| 2007/0022304 A1* | 1/2007 | Yanagawa | 713/186 |
| 2007/0160265 A1* | 7/2007 | Wakiyama | 382/117 |
| 2007/0168674 A1* | 7/2007 | Nonaka et al. | 713/182 |
| 2007/0171297 A1* | 7/2007 | Namgoong | 348/362 |
| 2007/0253604 A1* | 11/2007 | Inoue et al. | 382/118 |
| 2010/0138908 A1* | 6/2010 | Vennelakanti et al. | 726/11 |

FOREIGN PATENT DOCUMENTS

| | | |
|---|---|---|
| JP | 1999-339048 | 12/1999 |
| JP | 2003-259190 | 9/2003 |
| JP | 2004-259255 | 9/2004 |
| JP | 2005-135271 | 5/2005 |
| JP | 2005-148346 | 6/2005 |

* cited by examiner

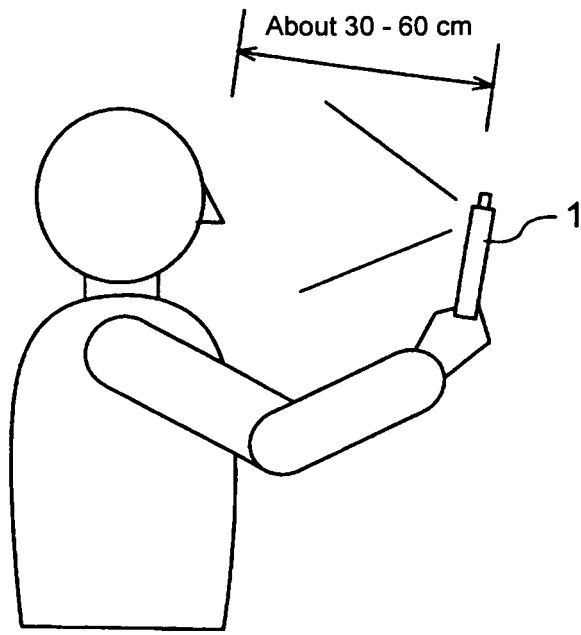
Fig. 4A  Picking up image of one's own face
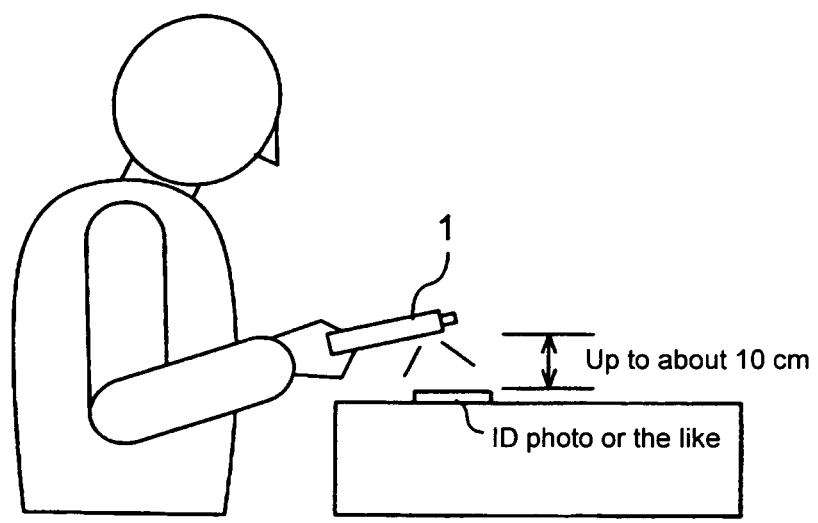
Fig. 4B  Picking up image of ID photo or the like

AUTHENTICATION APPARATUS AND PORTABLE TERMINAL

BACKGROUND OF THE RELATED ART

1. Field of the Invention

The present invention relates to a user authentication technique using a face image, and in particular to a technique effectively applicable to a portable terminal.

2. Description of the Related Art

In recent years, functions of the portable terminals (mobile phones, PDAs (Personal Digital Assistant), etc.) have been remarkably improved and have gained popularity. Electronic mail and Internet connectivity are becoming standard programs (functions) offered in many cases. Even terminals having electronic money transfer programs or terminals that can function as an IC card have been spreading in the market. These functions handle personal information and very important data such as electronic money. Therefore, security measures to prevent illegal use of the terminals and data leakage is actively being researched.

As a security measure for the portable terminals, "face authentication techniques" using a camera are currently under study. A "face authentication technique" capable of picking up the face image of a holder and identifying the holder (user authentication) is highly convenient. With mobile phones having a camera as standard equipment in many cases, another advantage is that the addition of special hardware is not required.

On the other hand, the user authentication device or system using the face image often encounters a problem of "spoofing". Spoofing is an act by a person that is not the legitimate holder, who attempts to be authenticated using a face photo of the legitimate holder.

A bag with a portable terminal therein, which may be stolen by snatching for example, or otherwise, often contains a card with a face photo such as a license or a student identification card. If one is able to easily fool the system using such a face photo, cases of illegal use may increase. This is especially likely given that portable terminals currently available are equipped with a camera of a mega pixel class, which have a variety of functions including auto focusing, macro imaging (close-up imaging) and zooming (enlarging the object), even a photo as small as an ID photo may contribute to spoofing of the system.

One idea known to obviate spoofing, is a method in which the user is required to perform a predetermined motion and it is determined whether the user has performed the motion meeting the requirement or not. In this method the dynamic image is used and therefore, the size of the comparison data required is large.

Another idea, is a method in which images are picked up a plurality of times under different lighting conditions, and by checking the shadows of the face, spoofing with the photo is prevented. This method, however, requires lighting equipment having sufficient luminance and therefore, it is difficult to incorporate into a portable terminal. In addition, each time user authentication is required, the light is turned on (i.e., each time the user tries to use the portable terminal) thereby inconveniencing the user.

SUMMARY

According to a first aspect of the invention, there is provided an authentication apparatus including an imaging device including, as a specified function, at least one of a macro imaging function (close-up imaging function), an auto focusing function and a zoom imaging function (object enlarging function), an authentication device for authenticating a user using a face image picked up by the imaging device, and an authentication limiting device for canceling the specified function of the imaging device picking up an image for user authentication.

According to a second aspect of the invention, there is provided an authentication apparatus including an imaging device including, as a specified function, at least one of a macro imaging function, an auto focusing function and a zoom imaging function, a switching device for switching to an on/off state of the specified function, an authentication device for authenticating a user using a face image picked up by the imaging device, and an authentication limiting device for prohibiting the picking up of the image for user authentication or the user authentication with the picked-up image in a case where the specified function is turned on by the switching device.

According to a third aspect of the invention, there is provided an authentication apparatus including an imaging device, an authentication device for authenticating a user with a face image picked up by the imaging device, and an authentication limiting device for prohibiting user authentication with the picked-up image in a case where the size of the face included in the picked-up image fails to satisfy a predetermined value.

According to a fourth aspect of the invention, there is provided an authentication apparatus including an imaging device, an authentication device for authenticating a user using a face image picked up by the imaging device, and an authentication limiting device for prohibiting user authentication with a plurality of images picked up at predetermined time intervals in a case where the face size variations among the plurality of the images are larger than a predetermined value.

According to a further aspect of the invention, an authentication apparatus includes a distance measuring device for measuring a distance to an object to be imaged, and in a case where the distance measured by the distance measuring device is smaller than a predetermined value, the authentication limiting device prohibits the imaging for user authentication or the image is picked up but user authentication is prohibited.

The portable terminal according to another embodiment of the invention includes any of the authentication apparatuses described above and a device for permitting the user to use the portable terminal when user authentication by the authentication apparatus ends in success.

BRIEF DESCRIPTION OF THE DRAWINGS

FIG. 4A shows the distance between the face and the imaging unit for a person imaging one's own face;

FIG. 4B shows the distance between an ID photo and the imaging unit;

DETAILED DESCRIPTION

The main types of false pretense include (1) a case in which the face image of a legitimate user is picked up from an ID photo or a snap shot (hereinafter referred to as "ID photo"), and (2) a case in which a photo of a legitimate user is secretly taken by others. If these two cases can be prevented, the security of portable terminals would sufficiently increase.

The present inventors have compared the process of obtaining a legitimate face image (the user picks up an image of one's own face) with the illegal process of obtaining a face image (the image picked up for the purpose of false pretense), and have found the unique difference between them as described below.

In a case where an illegal attempt is made to pick up a face image from an ID photo, the distance between the ID photo and the imaging device is required to be brought to several cm to about 10 cm, for example, due to the photo size (the size of the face in the photo). That is, without a close-up state, the face image of the size required for face authentication cannot be picked up. In a case where the user picks up the image of one's own face, on the other hand, a distance of about 30 cm to about 60 cm is set between the face and the imaging device.

In a case where the distance between the ID photo and the imaging device is set to about 30 cm to 60 cm, the face in the image picked up is too small so as not to be usable for face authentication.

In a case where an image of an object at the distance of several cm to about 10 cm is picked up, as compared with the case in which an image of an object at the distance of about 30 cm to about 60 cm is picked up, a hand move along the optical axis has a greater effect.

In a case where the user picks up one's own image (in what is called "self imaging"), on the other hand, the maximum distance between the face and the imaging device is about 70 to 80 cm due to the arm length. This upper distance limitation does not exist in a case where the image of the user is unknowingly taken by others. Rather, such an image would probably taken from a further distant in order to prevent the user from realizing the picture is being taken.

According to one embodiment of the invention, considering this unique feature, the case of false pretense is suppressed by the configuration described below.

With reference to the drawings, embodiments of the invention are illustratively explained below in detail. Although application of the invention to a mobile phone is described below, the invention is not limited to a mobile phone but is preferably applicable to mobile PCs, PDAs, game machines or all types of portable terminals having an imaging device (camera).

Figure 1:
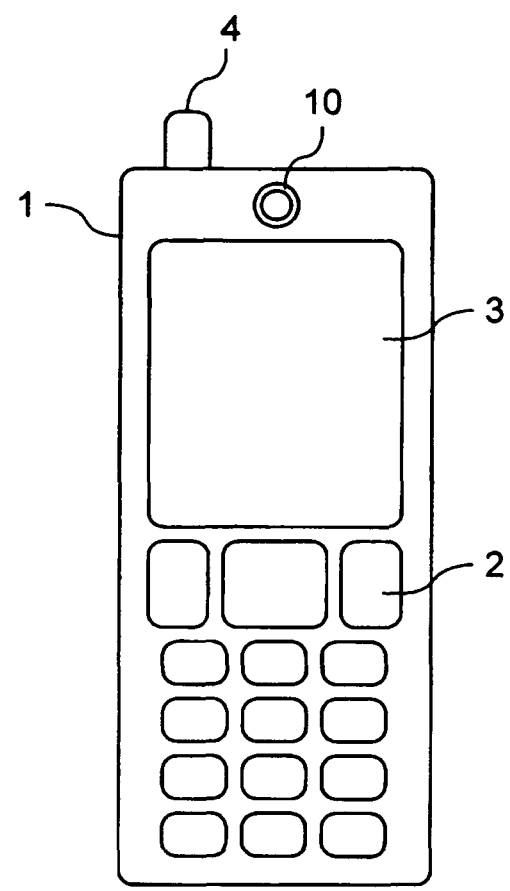
FIG. 1 shows an example of a configuration of a mobile phone.

FIG. 1 shows t an example of the configuration of the mobile phone. A mobile phone 1 generally includes an operation unit 2 having numerical buttons and function buttons, a display unit 3 having a liquid crystal display, an antenna 4 for radio communication, and an imaging unit 10. Also, though not shown, the mobile phone 1 has built therein hardware units such as a CPU (central processing unit), a main storage unit and an auxiliary storage unit.

The mobile phone 1 has the authentication function (authentication unit). This authentication function is accessed in response to an authentication request and authenticates the user by use of the face image picked up by the imaging unit 10. The authentication request is generated, for example, when power is switched on, the buttons are operated, the mobile phone, if of fold type, is opened or the function handling sensitive data is used (such as when the electronic money function or the IC card function is used or the personal information or device setting is checked or updated).

Once the user authentication ends in success (the user is recognized as legitimate), the user is permitted to use the device. In a case where the user authentication fails (the user is not recognized as the legitimate one or the authentication process cannot be executed due to an error at the time of imaging, face detection or feature value extraction), the subsequent user operation is rejected. As a result, the illegal use by persons other than the user is prevented.

The configuration of the authentication function (authentication unit) for executing the user authentication process is explained in detail below.

Figure 2:
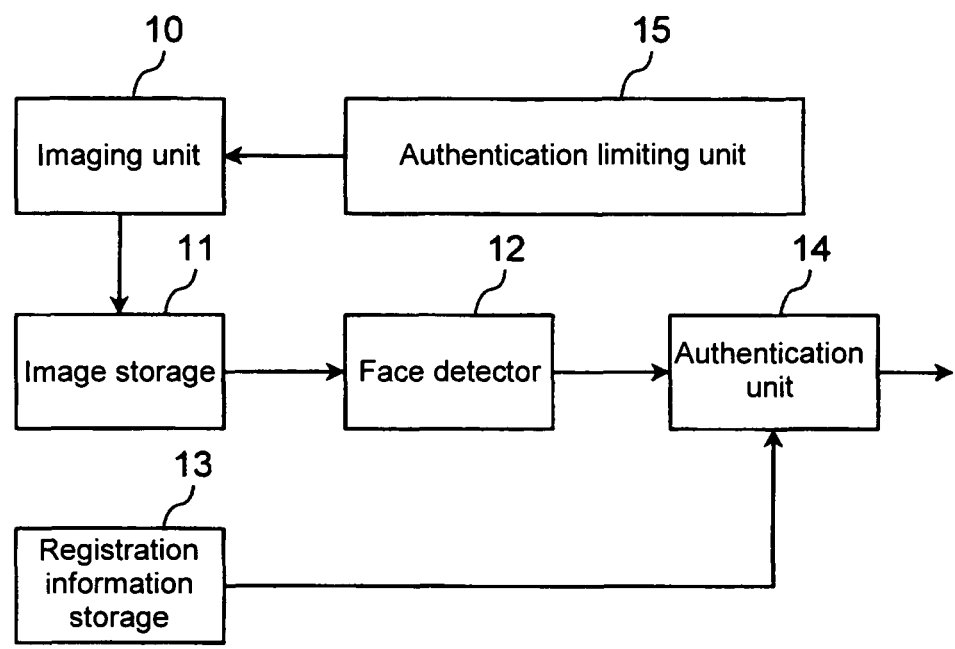
FIG. 2 shows a block diagram of a configuration of an authentication apparatus according to a first embodiment of the invention.

FIG. 2 is a block diagram showing a configuration of the authentication apparatus according to the first embodiment. The authentication apparatus is a function built in the mobile phone 1 and includes an imaging unit 10, an image storage unit 11, a face detector 12, a registration information storage unit 13, an authentication unit 14 and an authentication limiting unit 15. These functions are implemented in such a manner that the program stored in the auxiliary storage unit is loaded onto the main storage unit and executed by the CPU. Any one of these functions can of course be configured as a dedicated chip.

The imaging unit 10 is what is called a digital camera including an optical system (lens group), an imaging element (CCD: charge coupled device) and a CMOS (complementary metal-oxide semiconductor). The imaging unit 10 has the auto focusing function and the macro imaging function. The macro imaging function is turned on/off (switched between the macro imaging mode and the normal imaging mode) automatically. The imaging unit 10 can also include the zoom imaging function.

The image storage unit 11 is a memory for temporarily storing the image picked up by the imaging unit 10. The image stored in the image storage unit 11 is supplied for the user authentication process executed by the face detector 12 and the authentication unit 14.

The face detector 12 reads the image for user authentication from the image storage unit 11, detects the face of a person from the image, and specifies the position and size of the face thus detected. Once the face detection is successful, the result is delivered to the authentication unit 14.

The face detector 12 may be configured to detect the face by template matching using a reference template corresponding to, for example, the contour of the whole face. Also, the face detector 12 may be configured to detect the face by template matching based on the organs (eyes, nose, ears, etc.) of the face. Further, the face detector 12 may be configured to detect an apex, such as the head, by the chroma key processing and detect the face based on the apex. Furthermore, the face detector 12 may be configured to detect an area similar to the skin in color and detect the particular area as a face. In addition, the face detector 12 may be configured for learning with a teacher signal using a neural network to detect a face-like area as a face. What is more, the face detection processing by the face detector 12 may be realized by using any other existing techniques.

Also, in a case where the faces of a plurality of persons are detected from the image, the face detector 12 may determine a face to be processed, based on a predetermined reference. The size, the direction or the position of the face in the image is an example of the predetermined reference. Generally, the largest one of the faces is used as an object to be processed for authentication.

The registration information storage unit 13 is a memory for registering the feature value of the face of a legitimate user. The feature value of the face is, for example, the value of the brightness distribution or the color histogram which is the data accessed by the authentication unit 14 to execute the user authentication. The registration information storage unit 13 can register the feature values of a plurality of users.

The authentication unit 14 is a function to authenticate the user by means of the face image. That is, the authentication unit 14 extracts the feature value such as the brightness distribution or the color histogram from the face image detected by the face detector 12, and comparing it with the feature value of a legitimate user stored in the registration information storage unit 13, determines whether the person to be authenticated is a legitimate user or not. The feature values can be compared by acquiring the normalized correlation of the brightness distribution or the histogram intersection of the color histogram as a degree of analogy. In other words, it is determined whether the feature values are analogous to each other or not, and in a case where they are determined as analogous to each other, it is determined that the person involved is the same as the person registered in the registration information storage unit 13, (i.e. a legitimate user).

The authentication limiting unit 15 is the function to automatically cancel the macro imaging function of the imaging unit 10 for picking up an image for user authentication. In the above described embodiment, the apparatus authenticates the user in such a manner that the specified function of the imaging device is canceled, the face image is picked up by the imaging device with the specified function canceled and the face image picked up is used for user authentication. That is, the authentication limiting unit 15 switches to the normal imaging mode by controlling the actuator of the optical system of the imaging unit 10 and thus moves the lens group. Also, the lens movement is not limited to the lens arrangement for the macro imaging mode.

Figure 3:
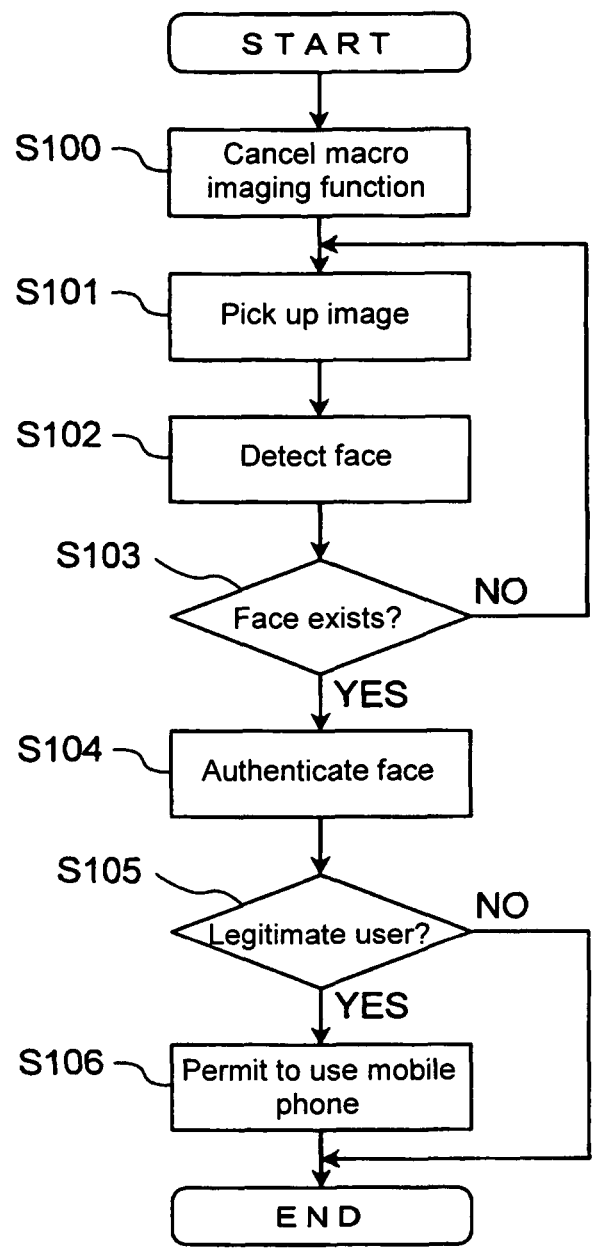
FIG. 3 shows a flowchart of the flow of the user authentication process according to the first embodiment of the invention.

With reference to the flowchart of FIG. 3, the flow of the user authentication process according to the first embodiment is explained. This user authentication process is executed in response to an authentication request.

Upon receipt of an authentication request, the authentication limiting unit 15 cancels (prohibits) the macro imaging function by controlling the imaging unit 10 (step S100). As a result, the normal imaging mode is set, and the image cannot be focused at a short distance of several cm to about 10 cm.

After that, the imaging unit 10 picks up an image in normal imaging mode, and the image is retrieved by the image storage unit 11 (step 101). The image thus picked up is displayed on the display unit 13 for confirmation. The face detector 12 reads the image from the image storage unit 11 and detects the face (step S102). The process of steps S101, S102 is repeated at predetermined time intervals until the face is detected (step S103).

Once the face is detected, the authentication unit 14 compares the feature value of the detected face with the feature value of the face registered in the registration information storage unit 13 and determines whether the face of the object is that of a legitimate user or not (step S104). In a case where the user authentication is successful (it is determined that the person involved is a legitimate user) (YES in step S105), the use of the mobile phone 1 is permitted (step S106). In a case where the user authentication fails (NO in step S105), on the other hand, the mobile phone 1 cannot be used.

As shown in FIG. 4A, in a case where a person picks an image of one's own face by holding the mobile phone 1, the distance, between the face and the imaging unit 10, is set at about 30 cm to 60 cm. At this distance, a sufficiently clear face image can be acquired in normal imaging mode. A legitimate user, therefore, succeeds in user authentication and can use the mobile phone 1, while other persons fail to authenticate themselves and cannot use the mobile phone 1.

As shown in FIG. 4B, a image of an ID photo is taken with the distance of at most about 10 cm between the ID photo and the imaging unit 10. According to this embodiment, the macro imaging function cannot be used at the time of user authentication, and therefore only a blurred image can be obtained. In a blurred image, the face contour is unclear and therefore, the face detection fails, or parts of the face such as the eyes, nose and mouth are so unclear that the feature value cannot be accurately extracted, thereby failing in user authentication. Thus, spoofing by attempting to use the ID photo is prevented.

With this configuration, at least one of the macro imaging function, the auto focusing function and the zoom imaging function is canceled automatically at the time of user authentication, and the image at the distance of several cm to about 10 cm cannot be focused. Then, an attempt to take a picture of an ID photo close-up could obtain only a blurred image. In the blurred image, the face organs such as the eyes, nose and mouth are unclear and therefore, the feature value required to identify an individual person cannot be accurately extracted. As a result, the user authentication would fail, and spoofing can be obviated. Even in a case where a picture of an ID photo is taken at the focusing distance, only a very small face image can be obtained, similarly resulting in a user authentication failure.

In step S100, the-authentication limiting unit 15 cancels both the macro imaging function and the auto focusing function of the imaging unit 10, thereby fixing the focal point at a predetermined distance (e.g., 45 cm). By fixing the focal point at a distance suitable for the user taking one's own picture in this way, the clarity of the face image taken at the time of imaging a person can be improved for an improved accuracy of user authentication. At the same time, the amount of blur of the face image obtained at the time of taking a close-up photo is advantageously increased and the effect of suppressing spoofing can be further enhanced.

In the embodiment described above, the macro imaging function is selected as a function (hereinafter referred to as a specified function) canceled or prohibited at the time of user authentication. As a specified function, however, the auto focusing function or the zoom imaging function may alternatively be selected. Also, a plurality of functions may be selected as specified functions. In a case where the zoom imaging function is selected as a specified function, for example, the zoom imaging function is canceled to prohibit the zooming (enlarging) in step S100 of FIG. 3. Both the macro imaging function and the zoom imaging function, if selected as specified functions, are canceled in step S100 of FIG. 3. The specified function can be selected by the user or automatically depending on the prevailing situation, or set in advance.

Also in the embodiments described below, one or a plurality of the functions including the macro imaging function, the auto focusing function and the zoom imaging function can be selected as a specified function(s). In a case where the function other than the macro imaging function is selected as a specified function, the process executed is similar to that of the macro imaging function. In a case where the zoom imaging function is a specified function, for example, step S201 in FIG. 6 determines whether the zoom imaging function is used or not (i.e., whether the image is zoomed (enlarged) or not).

The process shown in FIG. 3 determines whether the user is legitimate or not in one user authentication session. Nevertheless, the determination may be made from the result of a plurality of sessions of the user authentication process. For example, the process may be repeated until the user authentication succeeds (the upper limit of the number of times repeated should be predetermined) or the success rate is calculated from the result of a plurality of user authentication sessions and the determination is made whether the success rate has exceeded a predetermined threshold or not. In this way, the authentication accuracy can be improved.

According to the second embodiment of the invention, in a case where the macro imaging function is turned on, spoofing using an ID photo is suppressed by prohibiting the imaging operation. The parts different from those of the first embodiment are described below.

Figure 5:
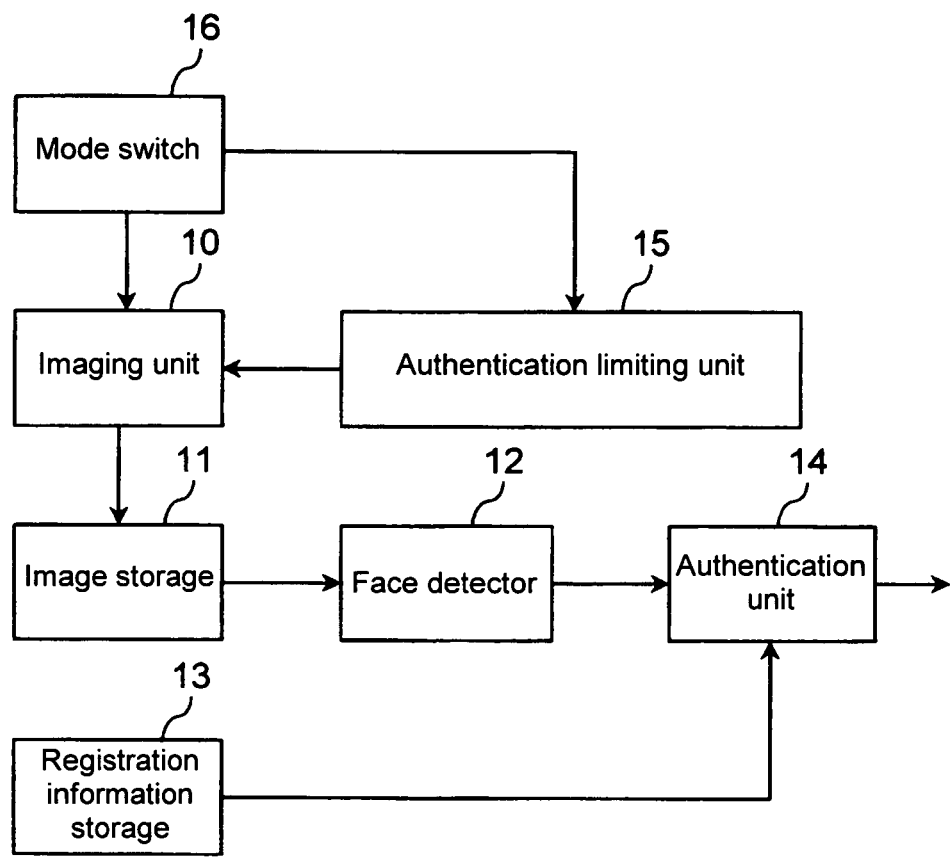
FIG. 5 shows a block diagram illustrating a configuration of the authentication apparatus according to a second embodiment.

FIG. 5 is a block diagram showing a configuration of the authentication apparatus according to the second embodiment. The authentication apparatus according to this embodiment includes a mode switch 16. The mode switch 16 is a device for switching an on/off state of the macro imaging function. The mode switch 16 can be configured to switch the lens configuration of the imaging unit 10 physically (mechanically) between the macro imaging mode and the normal imaging mode. In other words, according to this embodiment, the imaging mode of the imaging unit 10 is manually switched.

Figure 6:
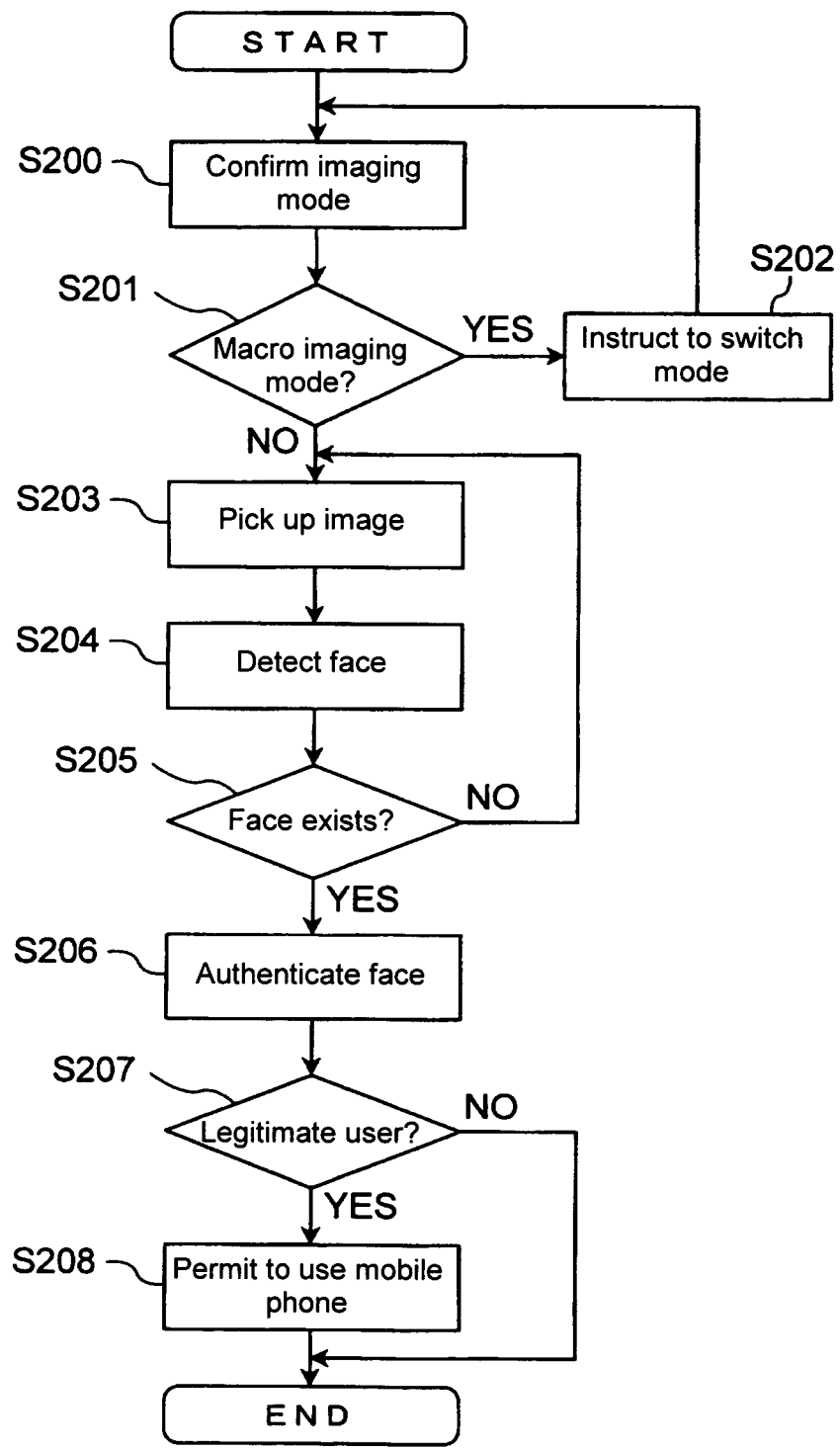
FIG. 6 shows a flowchart illustrating the flow of the user authentication process according to the second embodiment.

With reference to(the flowchart of FIG. 6, the flow of the user authentication process according to the second embodiment is explained.

Upon receipt of an authentication request, the authentication limiting unit 15 checks the setting of the mode switch 16 (step S200). In a case where the imaging mode is set to the macro imaging mode (YES in step S201), the authentication limiting unit 15 prohibits the pickup of an image, and a message such as "Switch to normal imaging mode" is displayed on the display unit 3 to prompt the mode switching (step S202). Once the imaging mode is turned to the normal imaging mode (NO in step S201), the authentication limiting unit 15 starts picking up an image (step S203). The subsequent processes (steps S204 to S208) are similar to the corresponding process of steps S102 to S106 of the first embodiment.

With the configuration according to this embodiment, the user authentication can be effected only in a case where the macro imaging function is off. Therefore, operational effects similar to those of the first embodiment can be exhibited, and spoofing using an ID photo is prevented.

Instead of prohibiting the image pickup when the macro imaging function is on, the face detection by the face detector 12 or the user authentication by the authentication unit 14 may be prohibited. At the time of user authentication by the authentication unit 14, the macro imaging function may be forcibly turned off. As an alternative, when the macro imaging function is on, the user authentication process may be immediately ended. That is, generally, in a case where a specified function is turned off by the switching device, the face image is picked up by the imaging device and the user is authenticated using the face image that was picked up, while in a case where the specified function is turned on by the switching device, the picking up of the image or the user authentication with the image picked up is prohibited. In a case where the imaging device has two or three functions, for example, the macro imaging function, the auto focusing function and the zoom imaging function, the prohibition of user authentication with one of the functions turned on can further enhance the effect of suppressing spoofing.

According to a third embodiment of the invention, whenever the face size in an image picked up fails to satisfy a predetermined value, the user authentication with the particular image is prohibited. In this way, spoofing is suppressed. The parts different from the embodiments described above are explained below.

The "predetermined value" is set based on the size that the face in the image can assume at the time of taking one's own picture. Also, the predetermined value may be a threshold indicating the minimum face size or an area indicating the appropriate range of the face size.

The functional configuration of the authentication apparatus is basically similar to that of the first embodiment. As compared with the first embodiment in which the authentication limiting unit 15 controls the imaging unit 10, however, this embodiment is different in that the authentication limiting unit 15 controls the authentication unit 14 based on the result of the operation of the face detector 12.

Figure 7:
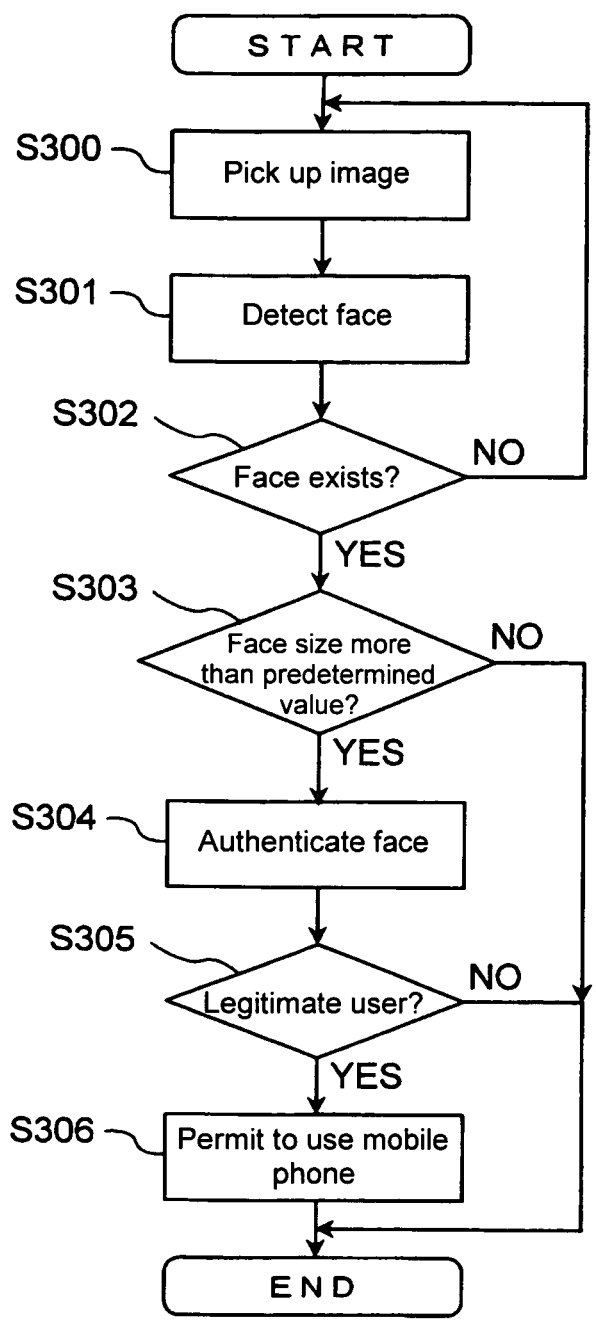
FIG. 7 shows a flowchart illustrating the flow of the user authentication process according to a third embodiment.

With reference to the flowchart of FIG. 7, the flow of the user authentication process according to the third embodiment is explained.

Upon receipt of an authentication request, the imaging unit 10 starts imaging (step S300), and the face detection process by the face detector 12 is executed (step S301). These processes are repeated until the face is detected (step S302).

Once the face is detected, the authentication limiting unit 15 determines whether the face size in the image satisfies a predetermined value or not (step S303). The "face size in the image", though definable in any way, can be regarded as the rectangular area S (number of pixels) defining the face (head) in a case under consideration. That is, the authentication limiting unit 15 calculates the area S of the face rectangle based on the face detection result, and compares the area S with a predetermined threshold value Smin. In a case where the area S is not less than the threshold value Smin, the image is determined as legitimate and the process is continued. In a case where the area S is smaller than the threshold value Smin, on the other hand, the image is considered illegitimate and the process is ended. The process of steps S304 to S306 is similar to the corresponding process of steps S104 to S106 of the first embodiment.

According to this embodiment, the threshold value Smin is set to the minimum size that the face in the image can assume when a person holding the mobile phone 1 picks up the image of one's own face. Assume that the size of the image of one's own face picked up with his/her arm fully extended is, for example, about one ninth of the screen. Then, the threshold Smin is set to about one ninth of the total number of pixels of the image. This value can be calculated from the average size of the faces of persons, the maximum distance allowable between the face and the imaging unit 10 when picking up the image of one's own face, the image angle of the imaging unit 10 and the total number of pixels of the image.

With the configuration according to this embodiment, the user authentication process is executed in a case where the user picks up the image of one's own face holding the mobile phone 1. In a case where a person other than the user secretly takes a picture of the legitimate user from a somewhat distant point, however, the size of the face in the image is smaller than the threshold value Smin, and therefore the user authentication is automatically prohibited. As a result, spoofing by sneaking an image is prevented.

Instead of the area of the face rectangle, the ratio of the area of the face (or the rectangle defining the face) to the area of the whole image, the relative distance between different parts of the face such as the eyes, nose and the mouth or the area of the skin-colored portion can be used to designate "the face size in the image".

Also, in a case where the face size is less than the threshold, the process may not be ended immediately, but a message to propose a method of picking up a legitimate image, such as "The face size is too small for imaging. Bring the face nearer to the camera.", etc., may be output on the display unit 3.

As another alternative, when starting the imaging operation, a frame line (guide line) indicating the desired face size may be displayed on the display unit 3 and the user is urged to set the position and size of the face in the frame. In a case where the face is not of the desirable size, a frame indicating the desired size may be displayed.

According to the fourth embodiment of the invention, assume that the face size variation is larger than a predetermined value among a plurality of images picked up at predetermined time intervals. By prohibiting the user authentication with the particular images, spoofing is suppressed. Only the points different from those of the embodiments described above are explained below.

The functional configuration of the authentication apparatus is basically similar to that of the first embodiment. As compared with the first embodiment in which the authentication limiting unit 15 controls the imaging unit 10, however, this embodiment is different in that the authentication limiting unit 15 controls the authentication unit 14 based on the result of the operation of the face detector 12.

Figure 8:
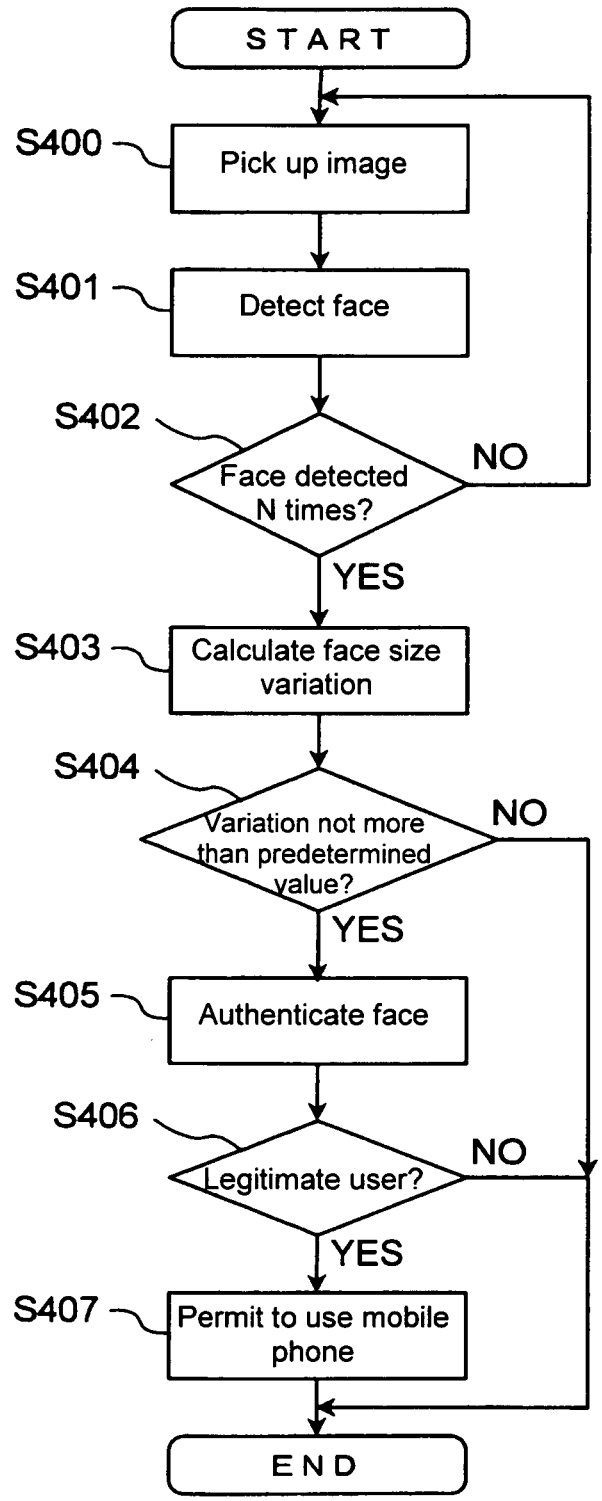
FIG. 8 shows a flowchart illustrating the flow of the user authentication process according to a fourth embodiment.

With reference to the flowchart of FIG. 8, the flow of the user authentication process according to the fourth embodiment is explained below.

Upon receipt of an authentication request, the imaging unit 10 starts the imaging operation (step S400), and the face detector 12 executes the face detection process (step S401). These processes are repeated at predetermined time intervals until the face is detected N times (step S402), where N is an integer of 2 or more.

After the face is detected N times, the authentication limiting unit 15 calculates the variation E (hereinafter referred to as the "moving degree E") of the face size among N images (step S403). The moving degree can be defined any way. For example, the distribution or standard deviation of the N face sizes detected from N images, the difference or ratio between maximum and minimum values of the face size, or the average value, intermediate value or maximum value of the difference or ratio in face size between the j-th image and (j+1)-th image ($1 \leq j \leq N-1$) can be employed as the moving degree.

Next, the authentication limiting unit 15 compares the calculated moving degree E with a preset threshold value Emax, and in a case where the moving degree E is not more than the threshold value Emax, the image is regarded as legitimate and the process is continued, while in a case where the moving degree E is larger than the threshold value Emax, the image is regarded as illegitimate and the process is ended (step S404). Incidentally, the process of steps S405 to S407 is similar to the process of steps S104 to S106 in the first embodiment.

Figure 9:
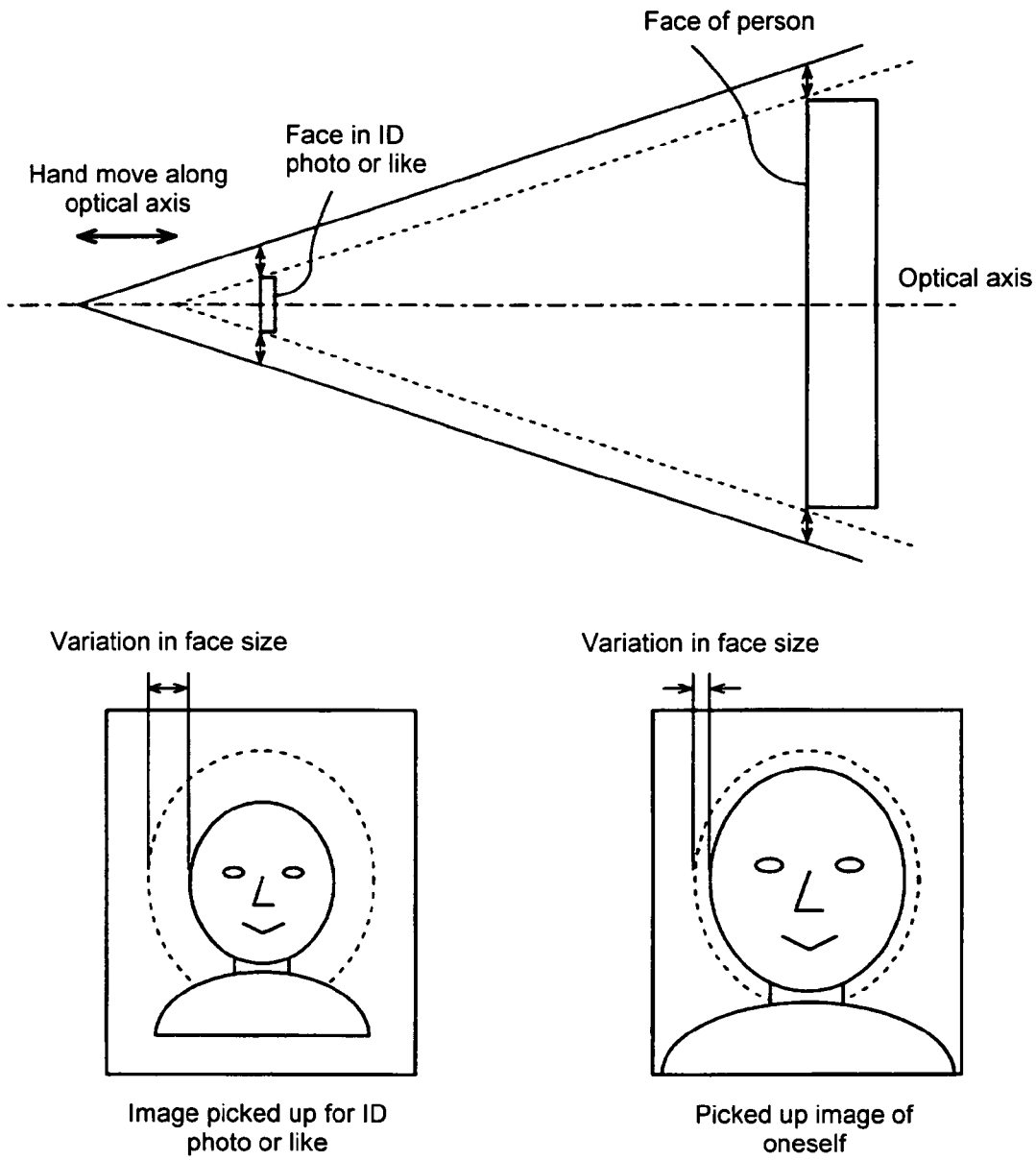
FIG. 9 shows the effect that the hand move along the optical axis has on the size change of an object.

As shown in FIG. 9, the shorter the distance between the object and the imaging unit 10, the larger the effect that the hand moves along the optical axis has on the size change of the object. In other words, the amount of hand movement along the optical axis being the same, the degree of movement E increases at the time of attempting to take a picture of an ID photo at a short distance of several cm to about 10 cm, while the moving degree E is smaller when the user attempts to take one's own picture. According to this embodiment, a threshold value Emax is set for the value between the face size change when taking the image of the ID photo in close-up mode and the face size change when taking the picture of one's own face.

In other words, the face image is picked up by an imaging device a plurality of times at predetermined time intervals by the imaging device and the face size variations among the plurality of the images are checked, so that in a case where the face size variations are not larger than a predetermined value, the user is authenticated using the particular face images, while in a case where the face size variations are larger than the predetermined value, the user authentication with the particular face images is prohibited. Therefore with the configuration according to the fourth embodiment, based on the variation of face size in the image, it is determined whether a person attempts to take a picture of one self or an ID photo in close-up mode. In the latter case, the user authentication is automatically prohibited. In this way, spoofing using the ID photo is prevented.

According to a fifth embodiment of the invention, the distance to an object is measured by the length measuring unit, and in a case where the distance is shorter than a predetermined value, the user authentication is limited thereby to suppress spoofing. Mainly the points different from the embodiments described above are described below.

Figure 10:
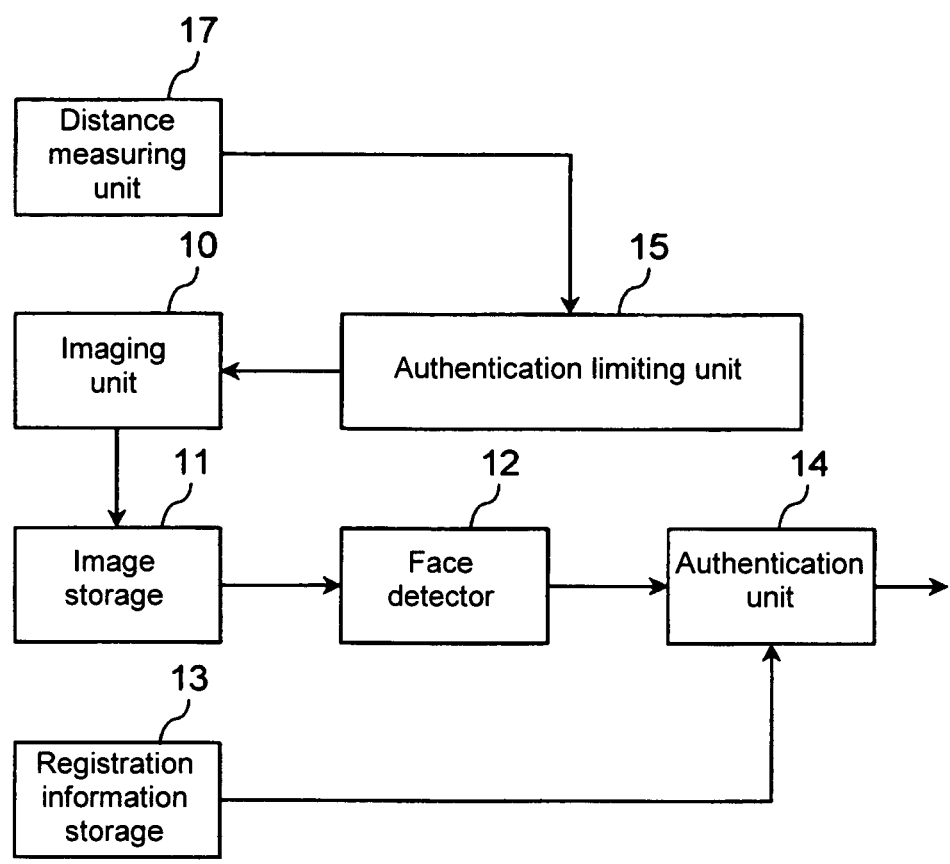
FIG. 10 shows a block diagram illustrating a configuration of the authentication apparatus according to a fifth embodiment.

FIG. 10 is a block diagram showing a configuration of the authentication apparatus according to the fifth embodiment. The authentication apparatus according to this embodiment includes a distance measuring unit 17. The distance measuring unit 17 is a distance measuring device for measuring a distance to the object. The distance measuring unit 17 may be configured to measure the distance based on the flying time of infrared light, etc., to estimate the distance from the amount of the blur of the image picked up by the imaging unit 10. Preferably, the distance measuring function used for automatic focusing of the imaging unit 10 is used as the distance measuring unit 17.

Figure 11:
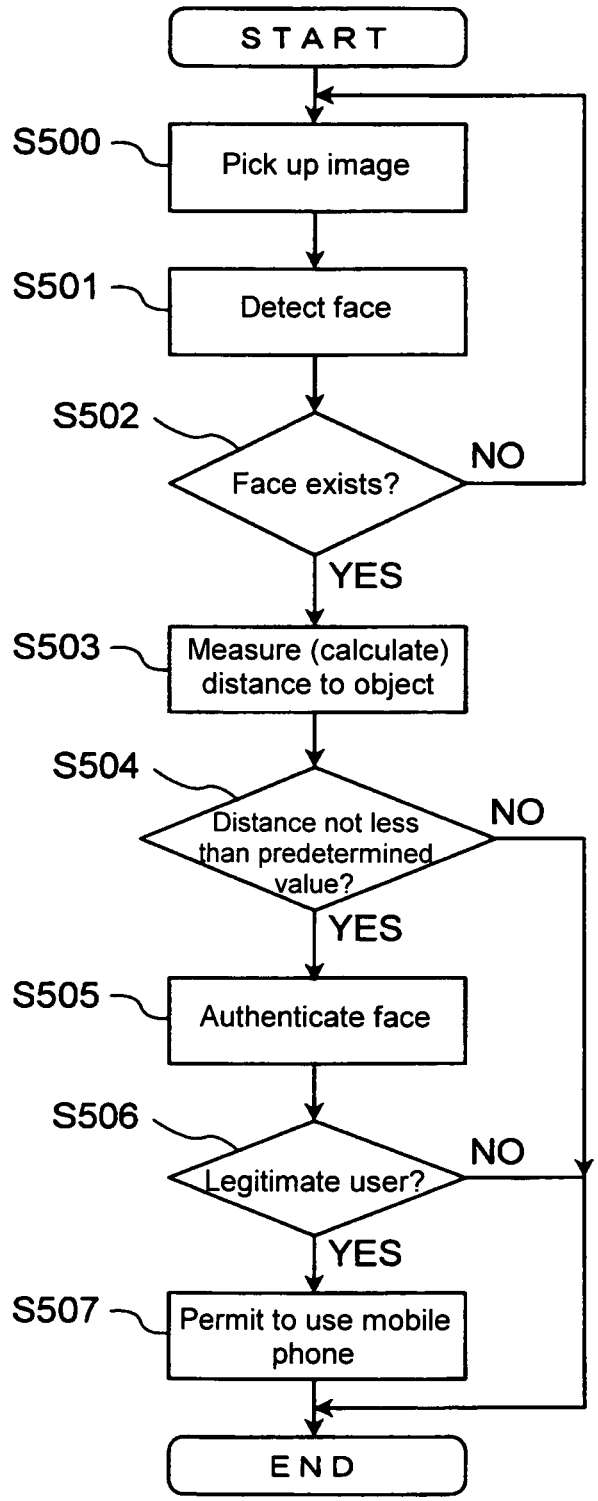
FIG. 11 shows a flowchart illustrating the flow of the user authentication process according to the fifth embodiment.

With reference to the flowchart of FIG. 11, the flow of the user authentication process according to the fifth embodiment is explained below.

Upon receipt of an authentication request, the imaging unit 10 starts the imaging operation (step S500), and the face detector 12 executes the face detection process (step S501). These processes are repeated until the face is detected (step S502).

Once the face is detected, the distance measuring unit 17 measures (calculates) the distance L between the object and the imaging unit 10 (step S503). Next, the authentication limiting unit 15 compares the distance L to the object with a preset threshold value Lmin, and in a case where the distance L is not less than the threshold value Lmin, the object is regarded as a legitimate one and the process is continued. In a case where the distance L is smaller than the threshold value Lmin, on the other hand, the object is determined as illegitimate, and the process is ended (step S504). Incidentally, the process of steps S505 to S507 is similar to the process of steps S104 to S106 of the first embodiment.

According to this embodiment, the threshold value Lmin is set at a value (e.g., 10 cm) between the distance (several cm to about 10 cm) for taking a picture of an ID photo in close-up mode and the distance (about 30 cm to 60 cm) for the user taking one's own picture. This configuration, like the first embodiment, also prevents spoofing using an ID photo.

According to the fifth embodiment, the distance is determined after face detection. Nevertheless, the distance may be determined first, and then in a case where the distance L to the object is smaller than the threshold value Lmin, the image pickup operation may be prohibited with equal effect.

The embodiments are described above in the first to fifth embodiments. However, they only illustrate specific examples of the invention, and the scope of the invention is not limited to these embodiments. The invention can thus be variously modified without departing from the technical concept thereof (e.g., by appropriately combining any two or more of the first to fifth embodiments described above).

What is claimed is:

1. An authentication apparatus comprising:
   an image device that has a selectable function, the selectable function including at least one of a macro imaging function, an auto focusing function, and a zoom imaging function;
   an authentication device that authenticates a user based on a self imaging of the user, the self imaging being captured by the user with the image device;
   an authentication limiting device that automatically disables use of the selectable function when the user captures the self imaging of user authentication; and
   a distance measuring device that measures a distance between the image device and the user, wherein the authentication limiting device prohibits the image device from capturing the self imaging for user authentication when the distance measured by the distance measuring device is smaller than a predetermined value,
   wherein the user has a portable terminal and the authentication apparatus is used for user authentication of the portable terminal,
   wherein the authentication limiting device fixes a focal point of the image device within a predetermined range so that the image device must be positioned approximately within the predetermined range to properly capture the self imaging for user authentication.

2. The authentication apparatus according to claim 1, further comprising a mode switch device that switches an on/off state of the selectable function.

3. A portable terminal comprising:
   an authentication apparatus, the authentication apparatus comprising:
      an image device that has a selectable function, the selectable function including at least one of a macro imaging function, an auto focusing function and a noon imaging function;
      an authentication device that authenticates a user based on a self imaging of the user, the self imaging being captured by the user with image device;
      an authentication limiting device that automatically disables use of the selectable function when the user captures the self imaging of user authentication; and
      a distance measuring device that measures a distance between the image device and the user, wherein the authentication limiting device prohibits the image device from capturing the self imaging for user authentication when the distance measured by the distance measuring device is smaller than a predetermined value,
   wherein the user has the portable terminal and the authentication apparatus is used for user authentication of the portable terminal, and the authentication device is activated in response to an authentication request, and
   wherein the authentication limiting device fixes a focal point of the image device within a predetermined range so that the image device must be positioned approximately within the predetermined range to properly capture the self imaging for user authentication.

4. The portable terminal according to claim 3, wherein the authentication request is triggered by at least one of switching power of the portable terminal on, operating at least one button on the portable terminal, and opening the portable terminal, if the portable terminal is of a fold or slide type.

5. An authentication apparatus comprising:
   an imaging device having at least one selectable function including at least one of a macro imaging function and a zoom imaging function;
   a switching device for switching an on/off state of the at least one selectable function;
   an authentication device for authenticating a user by using face detection on a face image captured by the imaging device;
   an authentication limiting device for prohibiting the imaging device from capturing a face image for user authentication when the at least one selectable function is set in the on state; and
   a distance measuring device that measures a distance between the image device and the user, wherein the authentication limiting device prohibits the image device from capturing the face image for user authentication when the distance measured by the distance measuring device is smaller than a predetermined value,
   wherein the authentication limiting device fixes a focal point of the imaging device within a predetermined range so that the imaging device must be positioned approximately within the predetermined range to properly capture the face image.

6. A portable terminal including the authentication apparatus of claim 5, further comprising:
   an operation device responsive to a signal from the authentication device, for allowing the user access to the portable terminal and its functions.

7. A portable terminal including the authentication apparatus of claim 5, wherein the authentication device is activated in response to an authentication request.

8. The portable terminal according to claim 7, wherein the authentication request may be triggered by at least one of switching power of the portable terminal on with a power switch of the portable terminal, operating at least one button on the portable terminal, and opening the portable terminal, if the portable terminal is of a fold or slide type.

9. An authentication method for a portable terminal comprising:
   providing an imaging device having at least one selectable function, the selectable function including at least one of a macro imaging function, an auto focusing function, and a zoom imaging function;
   automatically disabling use of the at least one selectable function to fix a focal point of the imaging device within a predetermined range so that the imaging device must be positioned approximately within the predetermined range to properly capture a self imaging for user authentication;
   capturing a self imaging of a user with the imaging device while the at least one selectable function is disabled;
   authenticating said user for use of the portable terminal using the self imaging;
   measuring a distance between the image device and the user; and prohibiting the imaging device from capturing the self imaging when the measured distance is smaller than a predetermined value.

10. The method according to claim 9, wherein automatically disabling use of the at least one selectable function further comprises preventing authentication of said user unless a mode switch device that switches an on/off state of the selectable function is in an off state.

11. A program stored on a non-transitory computer usable medium that, when executed by a processor for a portable terminal having an image device with at least one selectable function, the selectable function including at least one of a macro imaging function, an auto focusing function, and a zoom imaging function, causes the processor to perform an authentication process comprising the steps of:

automatically disabling use of the at least one selectable function to fix a focal point of the imaging device within a predetermined range so that the imaging device must be positioned approximately within the predetermined range to properly capture a self imaging for user authentication;

capturing a self imaging of a user with the imaging device while the at least one selectable function is disabled;

authenticating said user for use of the portable terminal using the self imaging;

measuring a distance between the image device and the user; and prohibiting the imaging device from capturing the self imaging when the measured distance is smaller than a predetermined value.

12. The non-transitory computer usable medium according to claim 11, wherein automatically disabling use of the at least one selectable function further comprises preventing authentication of said user unless a mode switch device that switches an on/off state of the selectable function is in an off state.

* * * * *